United States Patent
Hauck et al.

(10) Patent No.: US 10,722,973 B2
(45) Date of Patent: Jul. 28, 2020

(54) DYNAMIC ADJUSTMENT OF WELD PARAMETER OF AN ULTRASONIC WELDER

(71) Applicant: Branson Ultrasonics Corporation, Danbury, CT (US)

(72) Inventors: Andreas Hauck, Rodgau (DE); Matthias Poth, Ober-Ramstadt (DE); Didier Perret, Saint-Imier (CH); Christoph Manger, Seligenstadt (DE); Thierry Maire, Reignier (FR)

(73) Assignee: Branson Ultrasonics Corporation, Danbury, CT (US)

( * ) Notice: Subject to any disclaimer, the term of this patent is extended or adjusted under 35 U.S.C. 154(b) by 311 days.

(21) Appl. No.: 15/813,513

(22) Filed: Nov. 15, 2017

(65) Prior Publication Data
US 2018/0161914 A1    Jun. 14, 2018

Related U.S. Application Data (60) Provisional application No. 62/432,165, filed on Dec. 9, 2016.

(51) Int. Cl.
*B23K 20/00*    (2006.01)
*B23K 20/10*    (2006.01)
(Continued)

(52) U.S. Cl.
CPC .......... *B23K 20/106* (2013.01); *B06B 1/0207* (2013.01); *B23K 20/10* (2013.01);
(Continued)

(58) Field of Classification Search
CPC ...... B29C 65/08; B23K 20/10; B23K 20/106; H01R 43/0207
See application file for complete search history.

(56) References Cited

U.S. PATENT DOCUMENTS

2001/0004913 A1\*  6/2001  Maeda ................... B29C 65/08
                                                      156/73.1
2006/0177906 A1\*  8/2006  O'Connor .......... C07K 14/4703
                                                      435/69.1
(Continued)

FOREIGN PATENT DOCUMENTS

JP       H01161727 A      6/1989
JP       2001179837 A     7/2001
(Continued)

OTHER PUBLICATIONS

Japanese Office Action regarding JPSN 2017227428, dated Jan. 29, 2019.

*Primary Examiner* — Erin B Saad
(74) *Attorney, Agent, or Firm* — Harness, Dickey & Pierce, P.L.C.

(57) ABSTRACT

An ultrasonic welder includes dynamic adjustment of a weld parameter used to control welds of weld cycles during serial operation of the ultrasonic welder. The ultrasonic welder includes a power supply controlled by a controller and the controller sets a value of the weld parameter for a next weld cycle based on a value of a stack heat energy parameter indicative of heat energy in the ultrasonic stack prior to beginning the next weld cycle. The controller controls the power supply based on the value set for the weld parameter to control a weld in the next weld cycle.

12 Claims, 5 Drawing Sheets

(51) Int. Cl.
*B23K 31/12* (2006.01)
*B29C 65/08* (2006.01)
*B29C 65/00* (2006.01)
*B06B 1/02* (2006.01)

(52) U.S. Cl.
CPC ............ *B23K 31/125* (2013.01); *B29C 65/08* (2013.01); *B29C 66/1122* (2013.01); *B29C 66/43* (2013.01); *B29C 66/73921* (2013.01); *B29C 66/8322* (2013.01); *B29C 66/91231* (2013.01); *B29C 66/9241* (2013.01); *B29C 66/9511* (2013.01); *B29C 66/961* (2013.01); *B29C 66/963* (2013.01)

(56) References Cited

U.S. PATENT DOCUMENTS

| | | | |
|---|---|---|---|
| 2007/0068991 A1* | 3/2007 | Handel | B23K 20/106 228/1.1 |
| 2008/0054051 A1* | 3/2008 | Sheehan | B23K 20/10 228/110.1 |
| 2010/0147466 A1* | 6/2010 | Sans Marimon | B29C 65/08 156/580.2 |

FOREIGN PATENT DOCUMENTS

| | | |
|---|---|---|
| JP | 2007187128 A | 7/2007 |
| JP | 2014120644 A | 6/2014 |
| JP | 5926439 B1 | 5/2016 |
| JP | 2016196043 A | 11/2016 |

\* cited by examiner

DYNAMIC ADJUSTMENT OF WELD PARAMETER OF AN ULTRASONIC WELDER

CROSS-REFERENCE TO RELATED APPLICATIONS

This application claims the benefit of U.S. Provisional Application No. 62/432,165 filed on Dec. 9, 2016. The entire disclosure of the above application is incorporated herein by reference.

FIELD

The present disclosure relates to ultrasonic welders, and more particularly, to dynamically adjusting a weld parameter used in controlling welds during weld cycles of the ultrasonic welder.

BACKGROUND

This section provides background information related to the present disclosure which is not necessarily prior art.

Figure 1:
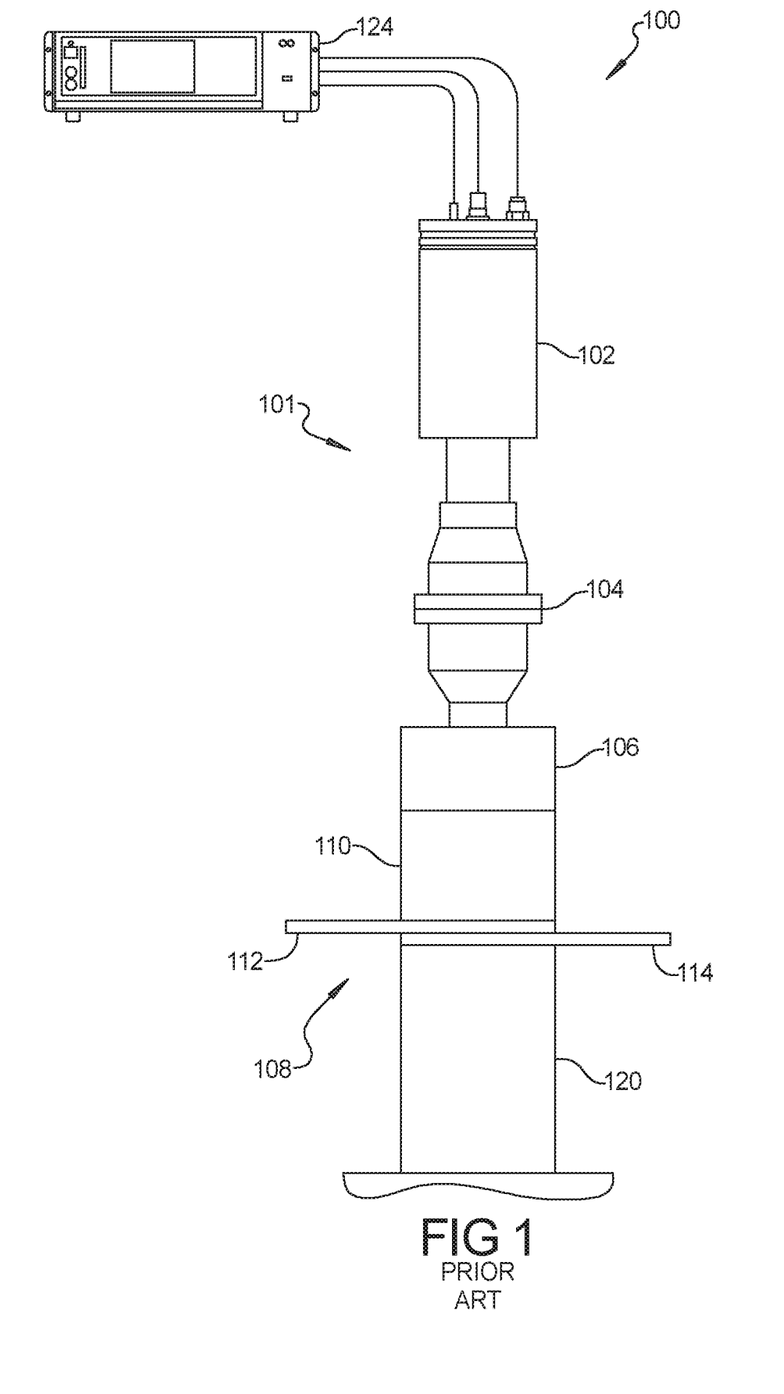
FIG. 1 is schematic view of a prior art ultrasonic welder.

A model of a typical ultrasonic plastic welder 100 is shown in FIG. 1. Typical components of ultrasonic plastic welder 100 include an ultrasonic stack 101 having an ultrasonic transducer 102, a booster 104, and an ultrasonic horn 106. As is commonly understood by those of skill in the art of ultrasonic welding, an ultrasonic horn is a metal bar that transfers mechanical energy from the ultrasonic transducer to the work piece. The ultrasonic horn is typically one-half wavelength long at the resonant frequency that is produced by the ultrasonic transducer. Electrical energy from a power supply 122 at a frequency of 20-60 kHz is converted to mechanical energy by the ultrasonic transducer 102. The mechanical energy converted in the ultrasonic transducer 102 is transmitted to an application 108, such as two parts 112, 114 that are to be welded together, through the booster 104 and the ultrasonic horn 106. The booster 104 and the ultrasonic horn 106 perform the functions of transmitting the mechanical energy as well as transforming mechanical vibrations from the ultrasonic transducer 102 by a gain factor. The ultrasonic welder 100 is controlled by a controller 124 that has inputs and outputs coupled to the applicable components of ultrasonic welder 100. It should be understood that power supply 122 can include controller 124 (as shown in FIG. 1) or controller 124 can be a separate device from power supply 122.

The mechanical vibration that results on a horn tip 110 is the motion that performs the task of welding the parts 112, 114 together, which in the following example are plastic parts. Horn tip 110 may be made of titanium or other high strength, hard material. The parts 112, 114 to be welded together are placed adjacent to the horn tip 110, such as being placed together on an anvil 120. The horn tip 110 is brought into contact with top part 112 to be welded. The ultrasonic horn 106 oscillates in a manner to impart vertical oscillations in the plastic pieces. That is, the ultrasonic horn causes oscillatory compression/decompression of the plastic parts with respect to each other causing surfaces of the plastic parts abutting each other at a weld interface to be heated, eventually melting together.

Most ultrasonic weld processes are processes controlled by a weld parameter. The weld parameter is a parameter that is used to determine when to stop the application of weld energy—the mechanical vibrations—to the parts being welded. In one example, the weld parameter is time in which case the weld process is a time controlled process where the mechanical vibrations are applied to the parts being welded for a predetermined period of time to which the weld parameter was set. In another example, the weld parameter is energy in which case the weld process is an energy controlled process where the mechanical vibrations are applied to the parts being welded until a predetermined amount of energy to which the weld parameter was set has been utilized. In another example, the weld parameter is a collapse distance in which case the weld process is a weld by collapse distance process where the mechanical vibrations are applied to the parts being welded until they have collapsed together by a predetermined distance to which the weld parameter was set. In this regard, collapse distance is often determined by the distance that the ultrasonic horn tip moves toward the anvil once the two parts being welded begin to melt together. It should be understood that other weld parameters can be utilized, such absolute distance, comparative distance, frequency, amplitude, amplitude profile, force, force profile, power output, temperature, and approach speed.

Ultrasonic welders used in automated installation are typically employed under stable operating conditions for best operation. Stable operating conditions are achieved when the stack has reached a stable temperature after a ramp-up phase. The ramp-up phase is the time after being idle or shutdown and the weld installation welds the first parts in series production of the production cycle until the time at which the stack has carried out a enough welds to reach a stable temperature. At the beginning of the ramp-up phase the stack has a lower temperature, for example the temperature of the environment where the welder is installed. The stack warms up as the ramp-up phase continues until it reaches a stable temperature. The ramp-up phase ends when the stack reaches a stable temperature.

A steady state condition is when the ultrasonic stack has reached a nominal stable temperature which is typically considered as occurring once ultrasonic welder has performed a sufficient number of weld operations for the ultrasonic stack to have reached the nominal stable temperature. However, the ultrasonic welder typically is never at a true steady state condition as the temperature of its ultrasonic stack can still vary even after reaching the nominal stable temperature such as due to changes in the ambient temperature of the area in which it is located. For example, the ambient temperature of an area of a factory in which the ultrasonic welder is located may be several degrees lower during the early morning than during the late afternoon. This difference in ambient temperature will affect the temperature of the ultrasonic stack even though the ultrasonic welder has been running continuously throughout the day.

As the temperature of the ultrasonic stack varies, so too does the heat energy in the ultrasonic stack. An increase in temperature of the ultrasonic stack results in increased heat energy in the ultrasonic stack and conversely, a decrease in temperature of the ultrasonic stack results in decreased heat energy in the ultrasonic stack. Variations in heat energy in the ultrasonic stack can cause variations in weld results of the ultrasonic welder. In this regard, the weld parameter used for the weld process is typically set for when the ultrasonic stack is at the steady state condition. Thus, as the heat energy in the ultrasonic stack varies due to variations in temperature of the ultrasonic stack, there can be resulting variations in weld results.

SUMMARY

This section provides a general summary of the disclosure, and is not a comprehensive disclosure of its full scope or all of its features.

In accordance with an aspect of the present disclosure, an ultrasonic welder includes a method of controlling the ultrasonic welder by the dynamic adjustment of a weld parameter used to control welds of weld cycles during serial operation of the ultrasonic welder. The ultrasonic welder has a power supply controlled by a controller, an ultrasonic stack including at least an ultrasonic horn, an ultrasonic transducer coupled to the power supply, and a booster coupling the ultrasonic horn to the transducer. The method includes setting with the controller a value of a weld parameter for a next weld cycle based on a value of a stack heat energy parameter indicative of heat energy in the ultrasonic stack prior to beginning the next weld cycle, and controlling the power supply with the controller based on the set weld parameter to control a weld in the next weld cycle.

In an aspect, values of the stack heat energy parameter for a plurality of weld cycles immediately preceding the next weld cycle are averaged to obtain an average and the value of the weld parameter for the next weld cycle is set based on the average. In an aspect, the plurality of weld cycles is in a range of two to five-hundred weld cycles. In an aspect, the plurality of weld cycles is in a range of fifteen to twenty-five weld cycles.

In an aspect, the value of the weld parameter for the next weld cycle is kept unchanged from a value of the weld parameter used for a most recent weld cycle if the average has not changed by at least a first predetermined threshold from the last time the value for the weld parameter was changed and the value of the weld parameter for the next weld cycle is set to a new value based on the average if the average has changed by at least the predetermined threshold. In an aspect, the value of the weld parameter for the next weld cycle is changed only when the average has changed by at least the first predetermined threshold and less than a second predetermined threshold.

In an aspect, the stack heat energy parameter is any of a temperature of the ultrasonic horn, resonant frequency of the ultrasonic stack, and a phase difference between a drive frequency of the power supply and a frequency at which the ultrasonic horn is vibrating. In an aspect, the stack heat energy parameter is a resonant frequency of the ultrasonic horn.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The following discussion will be with reference to prior art ultrasonic welder 100 of FIG. 1. In this regard, it should be understood that the method of controlling ultrasonic welder 100 in accordance with aspects of the present disclosure as described below differs from the method in which ultrasonic welders such as ultrasonic welder 100 have heretofore been controlled and the indication that FIG. 1 is prior art does not mean that the below described control methods are in the prior art.

In accordance with an aspect of the present disclosure, a parameter indicative of heat energy in an ultrasonic stack is monitored during operation of an ultrasonic welder. This parameter indicative of heat energy in the ultrasonic stack is referred to herein as the ultrasonic stack heat energy parameter ($ST_{HE}$). Based on a value of $ST_{HE}$ that is indicative of the heat energy in the ultrasonic stack at the beginning of a next weld cycle, a weld parameter used to control the weld during this next weld cycle is set. In this regard, the value of $ST_{HE}$ need not be obtained at the exact beginning of the next weld cycle but can be obtained at a point very shortly before the beginning of the next weld cycle, such as at the end of the immediately preceding weld cycle or the end of the weld of the immediately preceding weld cycle.

Also, an $ST_{HE}$ during each weld cycle in a predetermined number of successive weld cycles can be obtained and averaged and this average ("$ST_{AVG}$") used to set the weld parameter. For example, each such $ST_{HE}$ is illustratively obtained at the end of the weld of the applicable weld cycle. In an aspect, $ST_{AVG}$ the average is a rolling average of $ST_{HE}$ values obtained in the predetermined number of successive weld cycles immediately preceding the next weld cycle for which the value of weld parameter is being set. In an aspect, instead of a rolling average, $ST_{AVG}$ is calculated after each predetermined number of weld cycles. It should be understood that ultrasonic welder 100 is illustratively a high volume ultrasonic welder that is capable of running hundreds of weld cycles per minute thus having very short weld cycle times. Once the ultrasonic stack has reached the nominal steady state temperature, there is thus very little change in the heat energy of the ultrasonic stack from one weld cycle to the next successive weld cycle.

In an aspect, the weld parameter is not adjusted if $ST_{HE}$ or $ST_{AVG}$, as applicable, does not change by at least a first predetermined threshold (P1). If the change in the heat energy in the ultrasonic stack is small enough, this change will not have any appreciable effect on weld performance. Thus, the first predetermined threshold is set to reflect that there was enough of a change in the heat energy in the ultrasonic stack to result in enough of a change in weld performance that compensating for the change is desirable. This first predetermined threshold may illustratively be determined experimentally.

In an aspect, the weld parameter is also not adjusted if $ST_{HE}$ or $ST_{AVG}$, as applicable, changes more than a second predetermined threshold (P2). This aspect accounts for any anomalies that may occur in $ST_{HE}$ values, such as an unusually high value. This second predetermined threshold (P2) may also illustratively be determined experimentally.

The stack heat energy parameter $ST_{HE}$ can be any parameter that is indicative of heat energy in the ultrasonic stack. By way of example and not of limitation, these parameters include the temperature of the ultrasonic stack, the ultrasonic horn in particular, resonant frequency of the ultrasonic stack, the ultrasonic horn in particular, and the phase difference between a drive frequency of the power supply and the frequency at which the ultrasonic stack, the ultrasonic horn in particular, is vibrating.

Figure 2A:
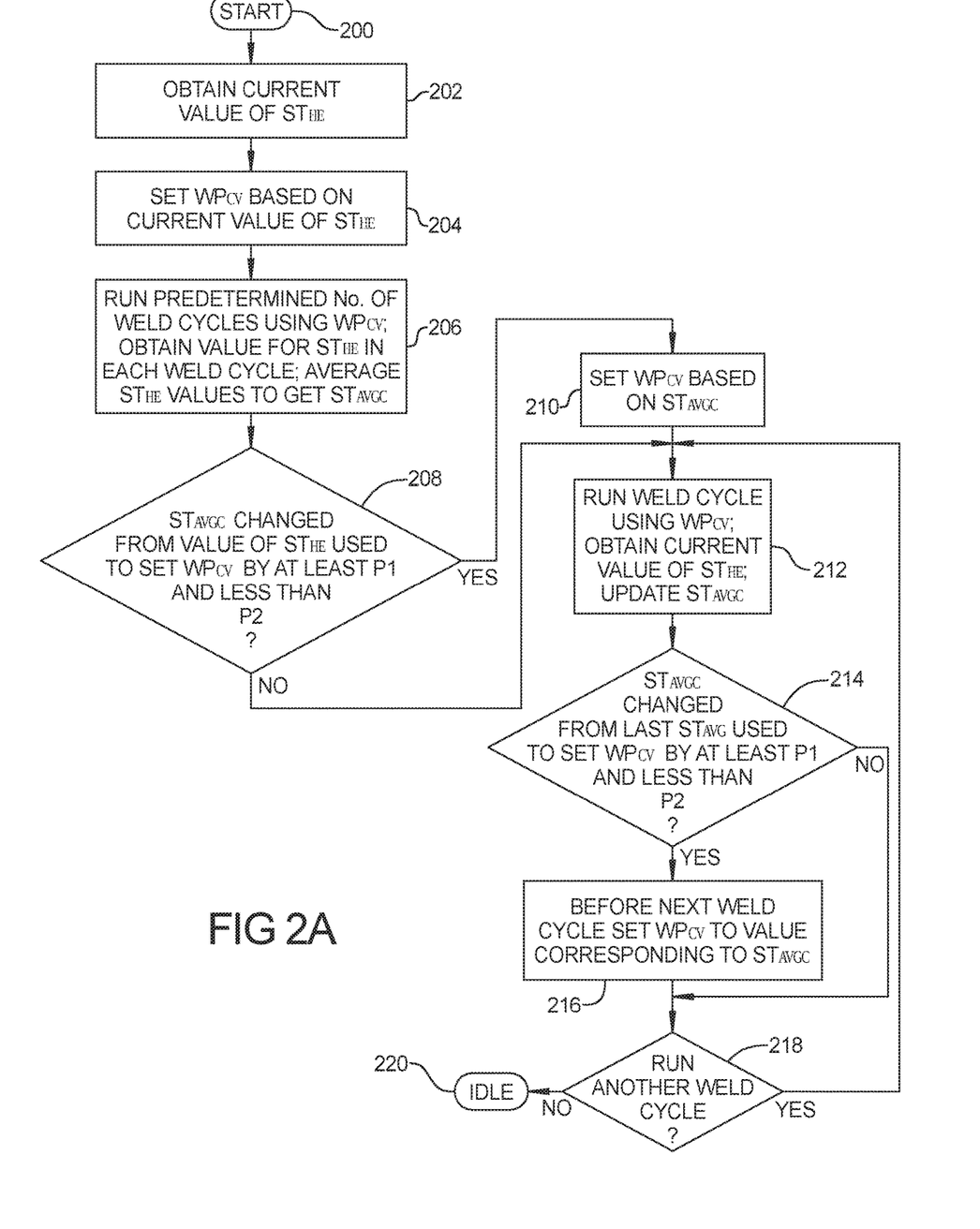
FIGS. 2A-2C are flow charts of control routines for setting values of weld parameters for weld cycles based on values of a parameter indicative of heat energy in an ultrasonic stack of an ultrasonic welder and controlling welds of the weld cycles based on the values of the weld parameters in accordance with an aspect of the present disclosure.

FIG. 2A is a flow chart of a control routine of the above described setting of the weld parameter, illustratively starting at the beginning of the ramp-up period. The control routine starts at 200. At 202, before running a weld cycle, the control routine obtains a current value of $ST_{HE}$. At 204, the control routine sets a value for the weld parameter (WP) to be used for the first weld cycle based on this current value of $ST_{HE}$, this value becoming the current weld parameter value ($WP_{CV}$). As used herein, the term current weld parameter value $WP_{CV}$ is used to refer to the value of the weld parameter that's used to control the weld of a weld cycle.

At 206, the control routine has ultrasonic welder 100 run a predetermined number of weld cycles using the current weld parameter value $WP_{CV}$ to control the welds of the weld cycles and obtain a value for $ST_{HE}$ at an appropriate point in each weld cycle, such as at the end of a weld made during each weld cycle. At 206, the control routine also averages these values of $ST_{HE}$ to obtain a current average $ST_{AVGC}$. At 208, the control routine checks whether the current average $ST_{AVGC}$ has changed from the value of $ST_{HE}$ used to set $WP_{CV}$ for the first weld cycle by at least the first predetermined threshold (P1) but less than the second predetermined threshold (P2), as discussed above. If it has, the control routine proceeds to 210 where it sets the current weld parameter value $WP_{CV}$ that will be used for the next weld cycle based on the current $ST_{AVGC}$ and then proceeds to 212. If not, the current weld parameter value $WP_{CV}$ isn't changed and the control routine proceeds to 212.

At 212, the control routine has ultrasonic welder 100 run a weld cycle using $WP_{CV}$, obtains a current value of $ST_{HE}$, and updates the current average $ST_{AVGC}$, such as by replacing the oldest value of $ST_{HE}$ with the value for $ST_{HE}$ obtained during the current weld cycle and then recalculates $ST_{AVGC}$. The control routine then proceeds to 214 where it checks whether the current average $ST_{AVGC}$ has changed from the last $ST_{AVG}$ used to set the current weld parameter value $WP_{CV}$ by at least the first predetermined threshold (P1) but less than the second predetermined threshold (P2), as discussed above. If it has, the control routine proceeds to 216 where it sets the current weld parameter value $WP_{CV}$ based on $ST_{AVGC}$ and then proceeds to 218. If at current average $ST_{AVGC}$ has not changed from the last $ST_{AVG}$ used to set the current weld parameter value $WP_{CV}$ by at least the first predetermined threshold (P1) but less than the second predetermined threshold (P2), the control routine branches to 218 where it checks whether another weld cycle is to be run or if the ultrasonic welder is to be transitioned to an idle state. If another weld cycle is to be run, the control routine branches back to 212. If another weld cycle is not to be run, the control routine branches to 220 where ultrasonic welder 100 is idled.

Figure 2B:
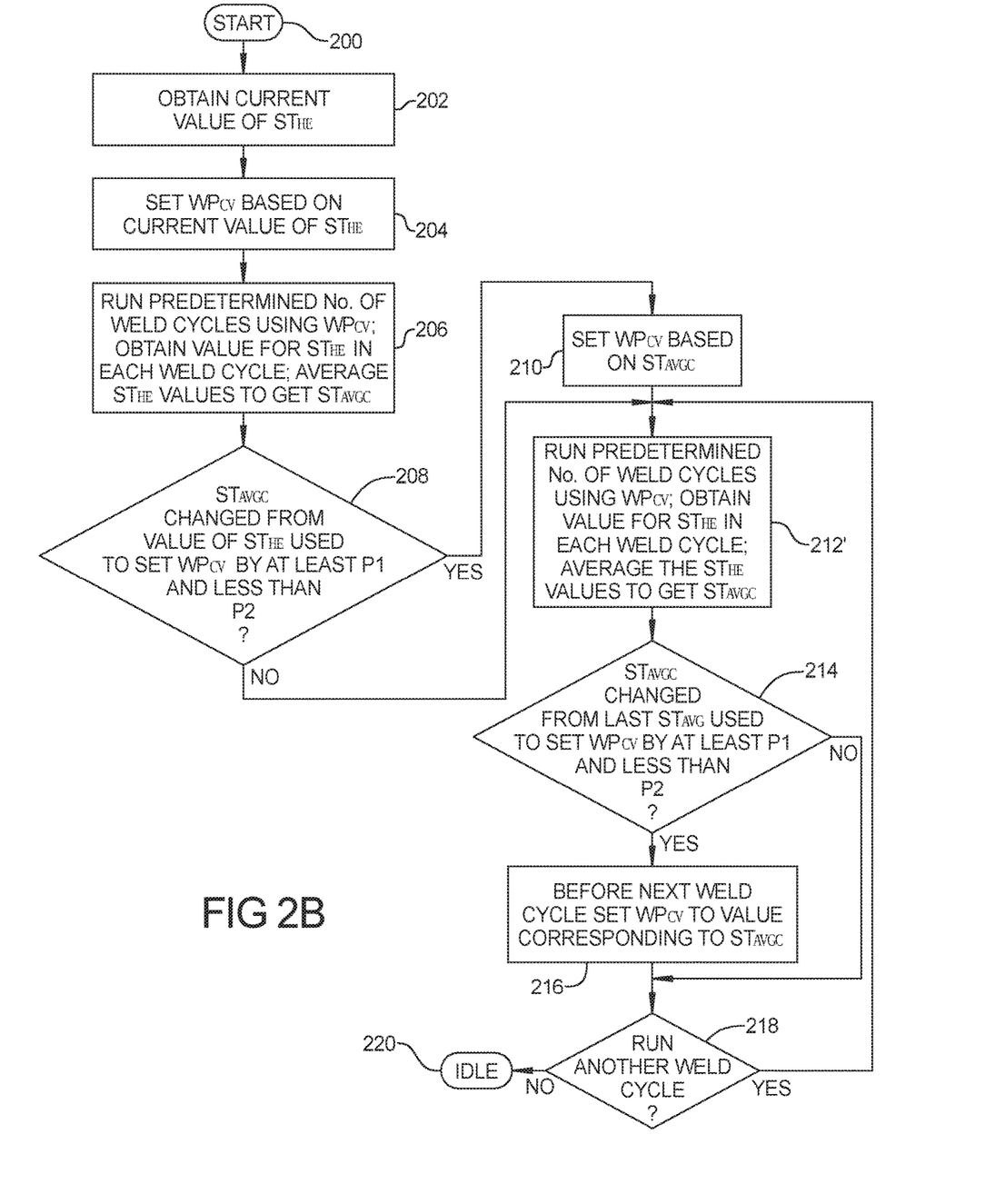

FIG. 2B is a variation of the control routine of FIG. 2A. Instead of recalculating $ST_{AVGC}$ after each weld cycle and determining whether the value of the weld parameter is to be used for the next weld cycle is to be changed, the control routine does this after each predetermined number of weld cycles as shown in block 212' of FIG. 2B.

Figure 2C:
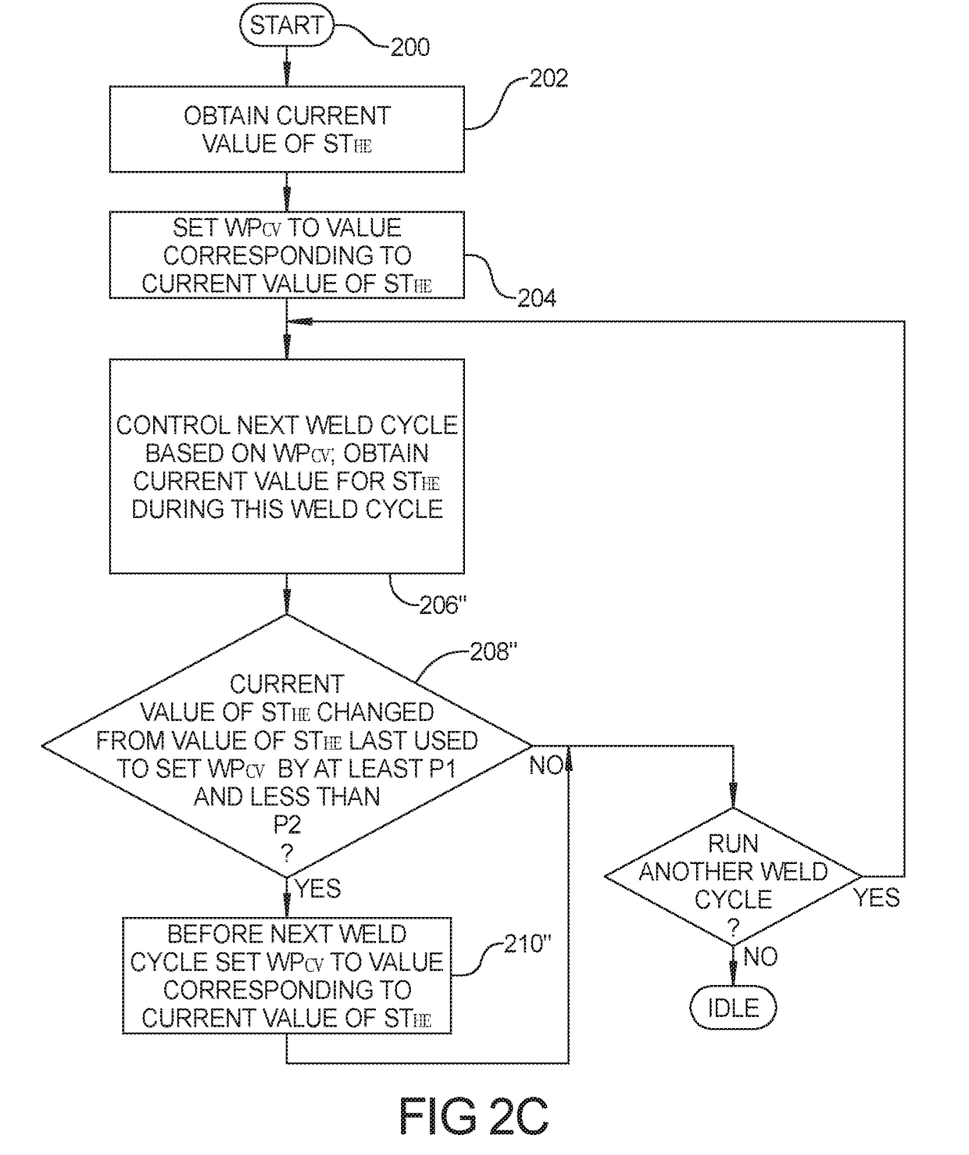

FIG. 2C is another variation of the control routine of FIG. 2A in which $ST_{HE}$ instead of $ST_{AVG}$ is used in setting $WP_{CV}$, as shown by blocks 206'', 208'' and 210'' in FIG. 2C.

In an aspect, the resonant frequency of the ultrasonic horn is used as $ST_{HE}$. With reference to FIG. 1, as is known in the prior art, as the temperature of ultrasonic horn increases, its resonant frequency decreases and conversely, as the temperature of the ultrasonic horn decreases, its resonant frequency increases. Also as is known in the prior art, power supply 122 monitors the resonant frequency of ultrasonic horn 106 during a weld period of each weld cycle and adjusts the frequency that power supply 122 is driving ultrasonic transducer 102, referred to hereinafter as the drive frequency, to maintain this drive frequency at the resonant frequency of ultrasonic horn 106. The weld period is the period that weld energy is being applied to the parts being welded during the current weld cycle.

In accordance with an aspect of the present disclosure, if the resonant frequency of ultrasonic horn 106 (which is used as $ST_{HE}$ parameter) increases or decreases, power supply 122 makes a corresponding change in the current weld parameter value $WP_{CV}$. In an aspect, power supply 122 makes the corresponding change in the current weld parameter value $WP_{CV}$ only if the resonant frequency of ultrasonic horn 106 increases or decreases by at least the predetermined first threshold (P1). In an aspect, power supply 122 makes the corresponding change in the current weld parameter value $WP_{CV}$ only if an average of the resonant frequencies of the ultrasonic horn at the end of each weld of a predetermined number of weld cycles has increased or decreased by at least the first predetermined threshold (P1). It should be understood that this predetermined number of weld cycles is dependent on parameters that effect how fast the temperature of the ultrasonic horn changes such as the weld application, the environment in which the ultrasonic welder is located, the cycle rate at which the ultrasonic welder is operating and the like. In an aspect, this predetermined number of weld cycles is determined heuristically. In an aspect, this average is a rolling average of the resonant frequencies of the ultrasonic horn obtained in the predetermined number of immediately preceding weld cycles. In an aspect, after each weld cycle and before starting the next weld cycle, power supply 122 sets a value for the current weld parameter value $WP_{CV}$ based on the current resonant frequency, or current average of the resonant frequencies as the case may be, of the ultrasonic horn 106, such as a current weld end frequency or seek frequency as discussed in more detail below. As used herein, the weld end frequency is the resonant frequency of the ultrasonic horn 106 at the end of a weld period, the current weld end frequency is the resonant frequency of ultrasonic horn 106 at the end of the weld period of the most recently completed weld cycle that immediately precedes the next weld cycle and the prior weld end frequency is the resonant frequency of ultrasonic horn 106 at the end of the weld period of the weld cycle that was completed immediately preceding the most recently completed weld cycle.

In an aspect, if the current weld end frequency changed by at least the predetermined first threshold (P1) amount from the immediately preceding weld end frequency, the current weld parameter value $WP_{CV}$ set by power supply 122 is changed to a value based on the current weld end frequency. In an aspect, if the average of the weld end frequencies for a predetermined number of successive weld cycles immediately preceding the next weld cycle has changed by at least the first predetermined threshold (P1) from the average of weld end frequencies last used in setting the value of the weld parameter, then the value of the current weld parameter value $WP_{CV}$ set by power supply 122 is changed to a value based on to the current average of weld end frequencies. $WP_{CV}$ is then used by power supply 122 as the weld parameter for the next weld cycle. In an aspect, a seek frequency determined by a seek performed prior to a first weld cycle is used as the resonant frequency of the ultrasonic horn 106 to determine the value of the current weld parameter value $WP_{CV}$ to use for the first weld cycle.

In an aspect, if the current weld end frequency or the average of the weld end frequencies, as applicable, has changed by a least a second predetermined threshold, then the current weld parameter value $WP_{CV}$ is not changed.

In an aspect, a correspondence between the resonant frequencies of ultrasonic horn 106 (or averages of the resonant frequencies) and values of the weld parameter is illustratively programmed into power supply 122, such as controller 124. The correspondence is determined by running a profiling procedure for ultrasonic welder 100 for a particular part. In an aspect, both a correspondence between seek frequencies and values of weld parameters and a correspondence between weld end frequencies and values of the weld parameter are programmed into power supply 122. In this aspect, the seek frequencies to values of weld parameters correspondence is used in selecting the value to use for the current weld parameter value $WP_{CV}$ when a seek frequency is used as the resonant frequency of the ultrasonic horn and the correspondence of weld end frequencies to values of weld parameters correspondence is used in selecting the value to use for the current weld parameter value $WP_{CV}$ weld parameter when a weld end frequency is used as the resonant frequency of the ultrasonic horn. It should be understood that this similarly applies to any other parameter that is used for $ST_{HE}$—a correspondence between $ST_{HE}$ values (or averages of $ST_{HE}$ values) and values of the weld parameter is determined and illustratively programmed into power supply 122, such as controller 124.

In an aspect, a change in value of weld parameter per Hz change in resonant frequency (referred to herein as $\Delta WP/Hz$) of the ultrasonic horn is determined and programmed into power supply 122. Each time a change is made to the current weld parameter value $WP_{CV}$, the current weld parameter value $WP_{CV}$ is increased or decreased by $\Delta WP*\Delta Hz$ where $\Delta Hz$ is the amount that the resonant frequency of the ultrasonic horn has changed. It should be understood that this similarly applies to any other parameter that is used for $ST_{HE}$ and the relationship then being more generally $\Delta WP*\Delta ST_{HE}$ where $\Delta ST_{HE}$ is the amount that the stack heat energy parameter $\Delta ST_{HE}$ has changed. It should also be understood that the sign for $\Delta ST_{HE}$ is negative when the heat energy in the ultrasonic stack increased which then results in a decrease in the value of the current weld parameter value $WP_{CV}$ and positive when the heat energy in the ultrasonic stack decreased which then results in an increase in the value of the current weld parameter value $WP_{CV}$. For example, where the resonant frequency of the ultrasonic horn is being used as $ST_{HE}$, $\Delta WP*\Delta Hz$ will be positive resulting in an increase $WP_{CV}$ when the resonant frequency of the ultrasonic horn has increased and negative $WP_{CV}$ when the resonant frequency of the ultrasonic horn has decreased.

An example of such a profiling procedure will be described as being run on ultrasonic welder 100 but it should be understood that it could be run on a separate ultrasonic welder configured the same as ultrasonic welder 100, such as an ultrasonic welder in a lab. The example profiling procedure is illustratively performed over the ramp-up period of ultrasonic welder 100. It should be understood that the profiling procedure could continue for a period after the ramp-up period and for example continue until temperature of the ultrasonic stack 101 reaches a maximum operational temperature.

During the example profiling procedure, an initial good weld of the parts to be welded, such as parts 112, 114, is performed with ultrasonic welder 100 at an ambient temperature such as 20° C. The weld parameter for this initial good weld (referred to herein as $WP_A$), the weld end frequency at the end of the weld period for this weld (referred to herein as $WEF_A$) and the seek frequency for this weld (referred to herein as $SF_A$) are recorded. A seek as is known in the art is running the ultrasonic welder 100 ultrasonic stack 101 in air. That is, power supply 122 excites ultrasonic stack 101 by driving ultrasonic transducer 102 at the drive frequency but with ultrasonic horn 106 not in contact with any parts 112, 114 or anvil 120. The seek is run prior to the weld cycle of this initial good weld and the seek frequency recorded. The seek frequency is the resonant frequency of ultrasonic horn 106 at the end of the seek. Ultrasonic welder 100 is then run stepwise through a series of weld cycles where it is welding parts 112, 114 until ultrasonic stack 101 reaches steady state—where there is no further frequency drop in the resonant frequency of ultrasonic horn 106 from weld cycle to weld cycle. The weld end frequency after each step is recorded as is the seek frequency. Each step may for example be an incremental amount of time, such as one minute (which could vary depending on the heat up rate of ultrasonic stack 101). Each step may for example be a weld cycle. The weld parameter is recorded once the ultrasonic stack 101 reaches steady state (referred to herein as $WP_B$) as are the weld end frequency (referred to herein as $WEF_B$) and seek frequency ($SF_B$).

Two characteristic curves are then created: Weld parameter vs. weld end frequency over time (WP vs. WEF) and weld parameter vs. seek frequency over time (WP vs. SF). Both curves will look like a linear function. The slope of both curves will be similar at any time. There will be a difference in frequency between the two curves which is constant and stack independent.

The difference between $WP_A$ and $WP_B$ ($WP_A-WP_B$) defines the full range of weld parameter settings over the ramp-up period. The difference between $WEF_A$ and $WEF_B$ defines the full range of the frequency shift of the resonant frequency of ultrasonic horn 106 during the ramp-up period. The set value of change in weld parameter ($\Delta WP$) per Hz shift in resonant frequency ($\Delta Hz$) of ultrasonic horn 106 during the ramp-up period is defined by $\Delta WP=(WP_A-WP_B)/WEF_A-WEF_B)$. A set of values for the weld parameter (WP) that correspond to weld end frequencies (WEFs) of ultrasonic horn 106 and the seek frequencies (SFs) of ultrasonic horn 106 are established using $\Delta WP$ to create the above discussed characteristic curves. There will thus be a different weld parameter (WP) value that corresponds to each resonant frequency of ultrasonic horn 106 over the full range of frequency shift of the ultrasonic horn 106 during the ramp-up period both a weld end frequency basis and a seek frequency basis, as reflected in the above two characteristic curves discussed above. Alternatively, as discussed above, $\Delta WP/Hz$ is used in determining changes to make to the values of the weld parameters during the operation of ultrasonic welder 100.

In an aspect, when ultrasonic welder 100 begins welding parts after it has been idle for an extended period or when it first starts welding parts, a seek is run before the first weld cycle and the seek frequency used to set the value of the weld parameter (WP). That is, the weld parameter (WP) corresponding to this seek frequency that had been programmed into power supply 122 is used by power supply 122 as the weld parameter (WP) for the first weld cycle. Thereafter, power supply 122 sets the weld parameter (WP) for the next weld cycle based on the weld end frequency of the most recently completed weld period.

Figure 3:
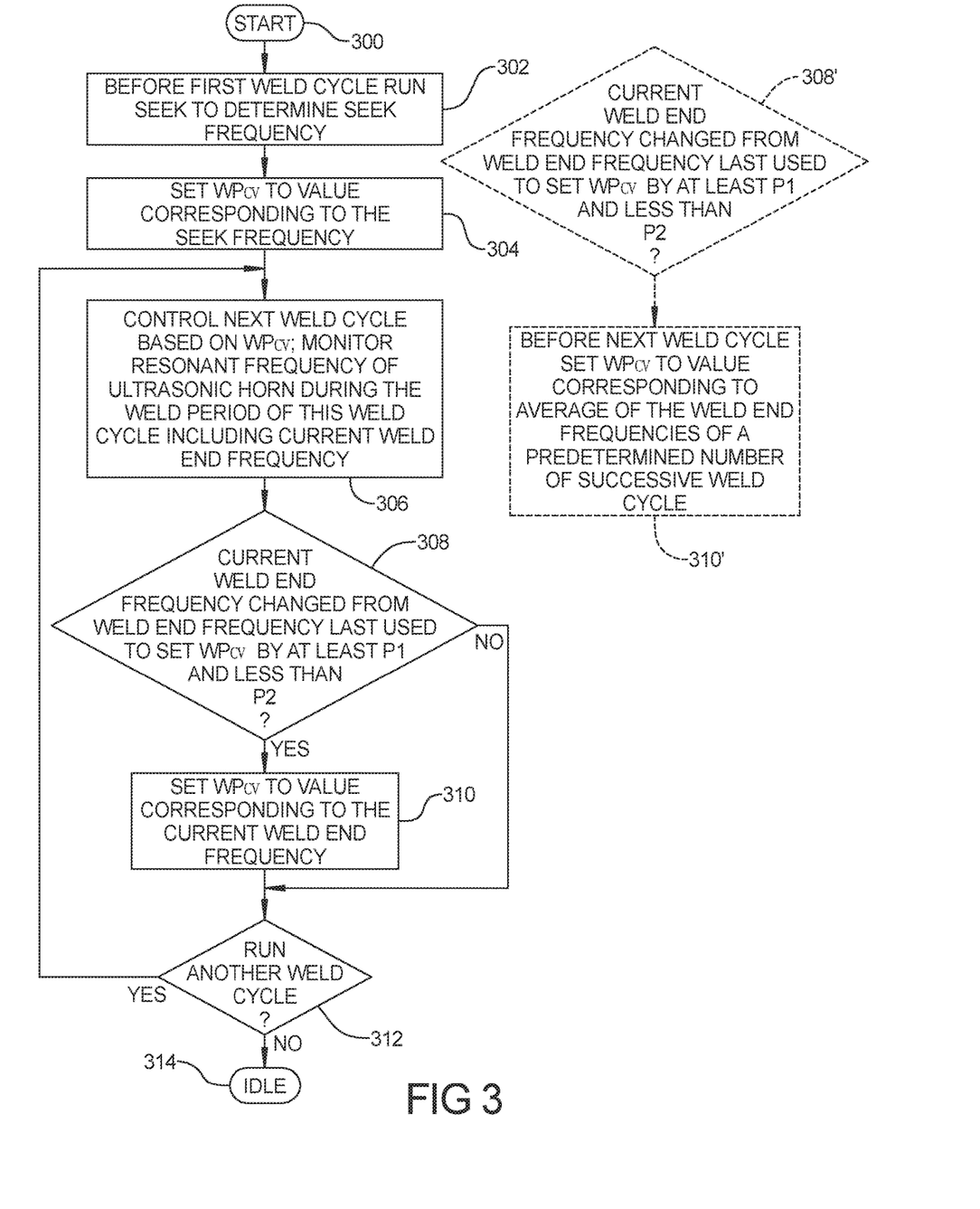
FIG. 3 is a flow chart of a control routine for setting weld parameters for weld cycles based on values of resonant frequencies of the ultrasonic horn that are indicative of heat energy in the ultrasonic stack and controlling welds of the weld cycles based on the values of the weld parameters in accordance with an aspect of the present disclosure.

FIG. 3 is a flow chart of a control routine of the above described setting of the current weld parameter value $WP_{CV}$ using the resonant frequency of ultrasonic horn 106 as $ST_{HE}$. The control routine starts at 300. At 302, before running a weld cycle, the control routine has power supply 122 run a seek and determine the seek frequency. At 304, the control routine sets the current weld parameter value $WP_{CV}$ to be used for the first weld cycle to a value based on this seek frequency and at 306 has ultrasonic welder 100 run a weld cycle using $WP_{CV}$ to control the weld during the weld cycle. The resonant frequency of ultrasonic horn 106 during the weld period of this weld cycle is also monitored including the current weld end frequency. At 308, the control routine checks whether the current weld end frequency changed from the weld end frequency last used to set $WP_{CV}$ by at least the first predetermined threshold (P1) and less than the second predetermined threshold (P2). If so, the control routine proceeds to 312 where it sets the current weld parameter value $WP_{CV}$ to be used for the next weld cycle to a value based on this current weld end frequency and then proceeds to 312. If at 308 the current weld end frequency did not change from the weld end frequency last used to set $WP_{CV}$ by at least the first predetermined threshold (P1) and less than the second predetermined threshold (P2), the control routine branches to 312. At 312, the control routine checks whether another weld cycle is to be run or if the ultrasonic welder is to be transitioned to an idle state. If another weld cycle is to be run, the control routine branches back to 306. If another weld cycle is not to be run, the control routine branches to 312 where ultrasonic welder 100 is idled. In a variation, an average of the weld end frequencies of a predetermined number of successive weld cycles is used in setting the current weld parameter value $WP_{CV}$ to be used for the next weld cycle as shown by phantom block 308' in FIG. 3.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

As used herein, the term controller, control module, control system, or the like may refer to, be part of, or include an Application Specific Integrated Circuit (ASIC); an electronic circuit; a combinational logic circuit; a field programmable gate array (FPGA); a processor (shared, dedicated, or group) that executes code; a programmable logic controller, programmable control system such as a processor based control system including a computer based control system, a process controller such as a PID controller, or other suitable hardware components that provide the described functionality or provide the above functionality when programmed with software as described herein; or a combination of some or all of the above, such as in a system-on-chip. The term module may include memory (shared, dedicated, or group) that stores code executed by the processor. When it is stated that such a device performs a function, it should be understood that the device is configured to perform the function by appropriate logic, such as software, hardware, or a combination thereof.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method of controlling an ultrasonic welder, the ultrasonic welder having a power supply controlled by a controller, an ultrasonic stack including at least an ultrasonic horn, an ultrasonic transducer coupled to the power supply, and a booster coupling the ultrasonic horn to the transducer, the method comprising:

dynamically adjusting a value of a weld parameter used to control welds of weld cycles during serial operation of the ultrasonic welder by (i) changing, with the controller, a value of the weld parameter for a next weld cycle based on a value of a stack heat energy parameter indicative of heat energy in the ultrasonic stack prior to beginning the next weld cycle in response to the value of the stack heat energy parameter having changed by more than a first predetermined heat energy threshold and by less than a second predetermined heat energy threshold from when the value of the weld parameter was last changed, and (ii) keeping the value of the weld parameter unchanged in response to the value of the stack heat energy parameter not having changed by more than the first predetermined heat energy threshold from when the value of the weld parameter was last changed; and controlling the power supply with the controller based on the value of the weld parameter to control welding during the next weld cycle.

2. The method of claim 1 further including averaging values of the stack heat energy parameter for a plurality of weld cycles immediately preceding the next weld cycle to obtain an average and using the average as the value of the stack heat energy parameter in determining whether to change the value of the weld parameter and setting the value of the weld parameter for the next weld cycle based on the average when it is determined to change the value of the weld parameter.

3. The method of claim 2 wherein the plurality of weld cycles is in a range of two to five hundred weld cycles.

4. The method of claim 3 wherein the plurality of weld cycles is in a range of fifteen to twenty-five weld cycles.

5. The method of claim 1 wherein the stack heat energy parameter is any of a temperature of the ultrasonic horn, resonant frequency of the ultrasonic stack, and a phase difference between a drive frequency of the power supply and a frequency at which the ultrasonic horn is vibrating.

6. The method of claim 5 wherein the stack heat energy parameter is the resonant frequency of the horn.

7. An ultrasonic welder, comprising:
a power supply controlled by a controller;
an ultrasonic stack including at least an ultrasonic horn, an ultrasonic transducer, and a booster coupling the ultrasonic horn to the ultrasonic transducer, the ultrasonic transducer being coupled to the power supply; and
the controller configured to dynamically adjust a value of a weld parameter used to control welds of weld cycles during serial operation of the ultrasonic welder by (i) changing a value of the weld parameter for a next weld cycle based on a value of a stack heat energy parameter indicative of heat energy in the ultrasonic stack in response to the value of the stack heat energy parameter having changed by more than a first predetermined heat energy threshold and by less than a second predetermined heat energy threshold from when the value of the weld parameter was last changed, and (ii) keeping the value of the weld parameter unchanged in response to the value of the stack heat energy parameter not having changed by more than the first predetermined heat energy threshold or having changed by more than the second predetermined heat energy threshold from when the value of the weld parameter was last change, and then control the power supply based on the value of the weld parameter to control welding during the next weld cycle.

8. The ultrasonic welder of claim 7 wherein the controller is configured to average values of the stack heat energy parameter for a plurality of weld cycles immediately preceding the next weld cycle to obtain an average and use the average as the value of the stack heat energy parameter in determining whether to change the value of the weld parameter and set the value of the weld parameter for the next weld cycle based on the average when the controller determines to change the value of the weld parameter.

9. The ultrasonic welder of claim 8 wherein the plurality of weld cycles is in a range of two to five hundred weld cycles.

10. The method of claim 9 wherein the plurality of weld cycles is in a range of fifteen to twenty-five weld cycles.

11. The ultrasonic welder of claim 8 wherein the stack heat energy parameter is any of a temperature of the ultrasonic horn, resonant frequency of the ultrasonic stack, and a phase difference between a drive frequency of the power supply and a frequency at which the ultrasonic horn is vibrating.

12. The ultrasonic welder of claim 11 wherein the stack heat energy parameter is the resonant frequency of the horn.

* * * * *